United States Patent [19]

Mongeau

[11] Patent Number: 5,129,627
[45] Date of Patent: Jul. 14, 1992

[54] RETAINER FOR LANDSCAPE ELEMENT

[76] Inventor: Eugene H. Mongeau, 189 Lakeshore Dr., Marlboro, Mass. 01752

[21] Appl. No.: 629,239

[22] Filed: Dec. 18, 1990

[51] Int. Cl.⁵ .................................. E04H 17/14
[52] U.S. Cl. ........................... 256/19; 403/234; 403/291; 403/397; 403/404; 52/102
[58] Field of Search ............ 256/1, 19, DIG. 5; 404/7, 8; 52/102, 712; 47/33; 403/213, 232.1, 234, 238, 239, 241, 291, 397, 404, 406.1

[56] References Cited

U.S. PATENT DOCUMENTS

| | | | |
|---|---|---|---|
| 122,947 | 1/1872 | Hopgood | 256/DIG. 5 |
| 593,868 | 11/1897 | Walter | 403/397 |
| 953,060 | 3/1910 | Ross | 256/19 X |
| 1,945,784 | 2/1934 | Myer . | |
| 2,283,167 | 5/1942 | Burson | 52/241 |
| 2,620,531 | 12/1952 | Chandler | 52/712 |
| 2,842,344 | 4/1988 | Todd . | |
| 3,102,614 | 9/1963 | Lydard | 403/397 X |
| 3,277,606 | 4/1986 | Cohen . | |
| 3,545,128 | 12/1980 | LaFontaine . | |
| 3,726,042 | 4/1973 | Haile | 256/19 X |
| 3,922,103 | 11/1975 | Hirato | 403/397 |
| 4,508,319 | 4/1985 | Tappan et al. . | |
| 4,640,063 | 2/1987 | Ayala | 52/712 X |
| 4,905,409 | 9/1990 | Cole . | |

*Primary Examiner*—Randolph A. Reese
*Assistant Examiner*—Heather Chun
*Attorney, Agent, or Firm*—Blodgett & Blodgett, P. C.

[57] ABSTRACT

A retainer for a landscape body which has a pair of base portions for supporting the bottom surface of the body, a pair of feet portions which extend downwardly from the base portion for penetrating the ground and anchoring the body to the ground, and a pair of arm portions which connect the base portions for engaging the side surfaces of the landscape body.

9 Claims, 2 Drawing Sheets

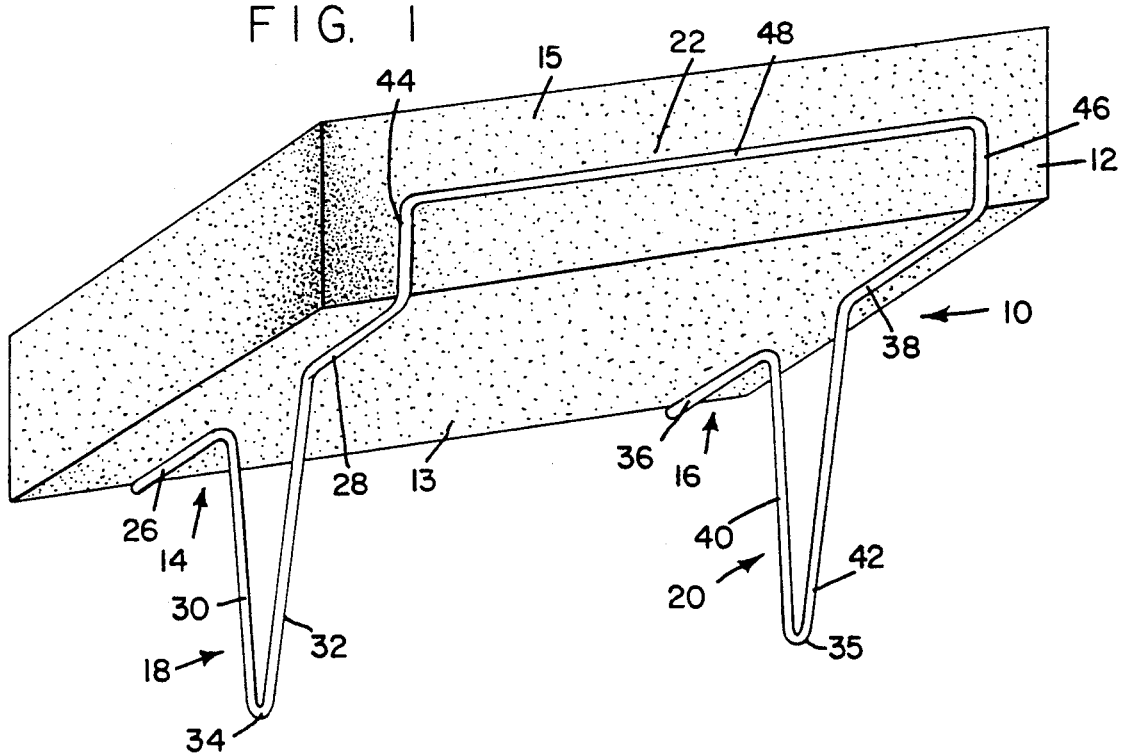
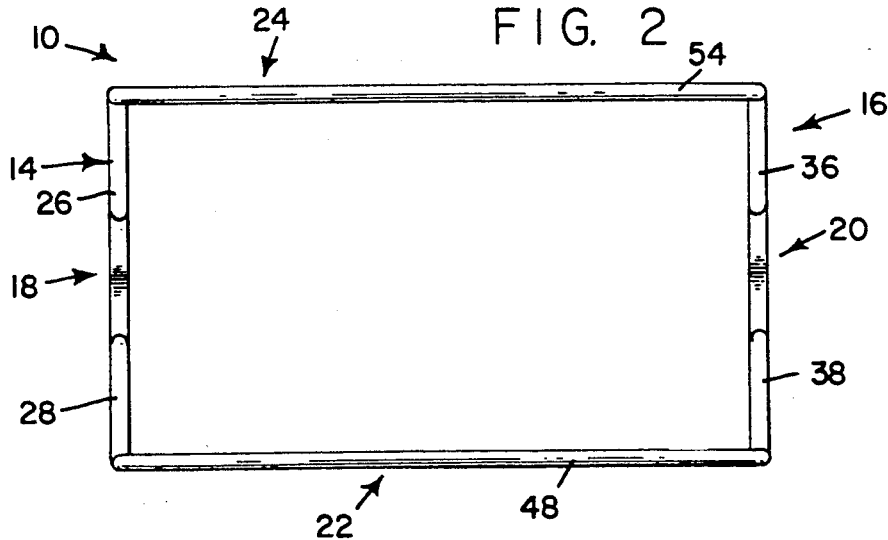

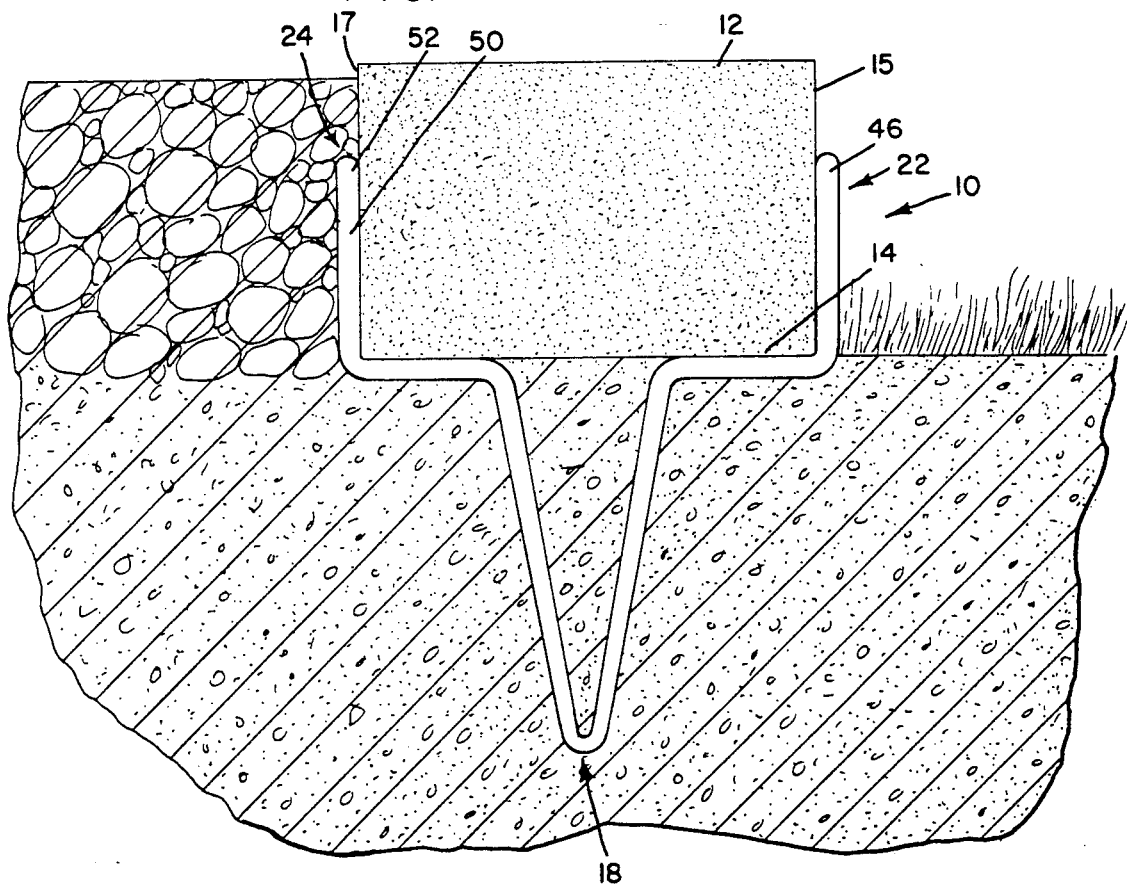

RETAINER FOR LANDSCAPE ELEMENT

BACKGROUND OF THE INVENTION

The present invention relates to a retaining device for landscape elements and particularly to landscape elements which have a generally rectangular configuration such as bricks and landscape timbers, such as railroad ties.

Landscape timbers and bricks are utilized to form retaining walls and decorative boarders around trees, walkways, flower beds and lawns. There is a tendency for the landscape elements to move out of position over a period of time due to the effects of frost or bumping from feet, bicycles, wheelbarrows, carts, etc. Some of the means for anchoring the landscape elements to the ground include pegs which are inserted through holes that are drilled through a landscape timber, or stakes which are attached to a landscape element. Each type of stake is specifically designed for a particular landscape configuration and has limited application to the type of element for which it is designed. The limitations of the prior art devices have been obviated by the present invention.

It is, therefore, a principle object of the invention to provide a universal retainer for a landscape element which can be applied to many types of generally rectangular elements.

Another object of this invention is the provision of a retainer for generally rectangular landscape elements of wood or masonry.

A further object of the present invention is the provision of a retainer for a landscape element which is simple in construction, can be manufactured inexpensively without being cast or machined.

A still further object of the present invention is the provision of a retainer for a landscape element which is adjustable to landscape element of different widths.

It is another object of the present invention to provide a retainer for landscape elements which is simple to apply and which is capable of a long life of useful service with no maintenance.

With these and other objects in view, as will be apparent to those skilled in the art, the invention resides in the combination of parts set forth in the specification and covered by the claims appended hereto.

SUMMARY OF THE INVENTION

In general, the invention consists of a retainer for a generally rectangular landscape element or body. The retainer has a pair of spaced base portions for engaging the bottom of the landscape element and a foot which extends downwardly from each base portion for anchoring the body to the ground and a pair of opposed elongated arms which connects the bases on opposite sides thereof for engaging the side surfaces of the landscape body so that the body is retained between the arms. More specifically, the retainer is made from a single piece of resilient and flexible wire which is bent into the configuration described above.

BRIEF DESCRIPTION OF THE DRAWINGS

The character of the invention, however, may be best understood by reference to one of its structural forms, as illustrated by the accompanying drawings, in which:

FIG. 1 is a perspective view of a retainer embodying the principles of the present invention and shown applied to a landscape body, such as a brick.

FIG. 2 is a top plan view of the retainer, and

FIG. 3 is an end elevational view of the retainer shown applied to a landscape body and embedded into the ground.

DESCRIPTION OF THE PREFERRED EMBODIMENT

Referring to the drawings, the retainer of the present invention is generally indicated by the reference numeral 10 and is shown in FIG. 1 applied to a landscape body such as a brick 12. The retainer 10 comprises a first base which is generally indicated by the reference numeral 14 and a second base which is generally indicated by the reference numeral 16 and which is spaced from the first base 14. A first foot 18 extends downwardly from the first base 14 and a second foot 20 extends downwardly from the second base 16. A first arm, generally indicated by the reference numeral 22, is connected at one end to the first base 14 and at its other end to the second base 16 and extends upwardly from the first and second bases. A second arm, generally indicated by the reference numeral 24, is connected to the opposite sides of the bases 14 and 16 and extends upwardly from the bases.

The first base 14 has a first horizontal portion 26 and a second horizontal portion 28 which is spaced from the first portion 26. The first foot 18 has a first element 30 which extends downwardly from the inner end of the first base portion 26 and a second element 32 which extends downwardly at an angle from the inner portion of the second base portion 28. The foot elements 30 and 32 converge in a downward direction and are joined at their bottom ends at 34 so that the first foot 18 has a V-shaped configuration. The second base 16 has a first horizontal portion 36 and a second horizontal portion 38 which is spaced from the first portion 36. The second foot 20 has a first element 40 which extends downwardly at an angle from the inner end of the first base portion 36 and a second element 42 which extends downwardly at an angle from the inner end of the second base portion 38. The foot elements 40 and 42 converge in a downward direction and are joined at the bottom at 35. The first arm 22 comprises a vertical portion 44 which extends upwardly from the outer end of the second base portion 28 and a vertical portion 46 which extends upwardly from the second portion of the second base 16. A horizontal portion 48 extends from the upper end of the vertical portion 44 to the upper end of the vertical portion 46. The second arm 24 has a vertical portion 50 which extends upwardly from the outer end of the first portion 26 of the base 14 and a vertical portion 52 which extends upwardly from the outer end of the first portion 36 of the base 16. A horizontal portion 54 extends from the upper end of the vertical portion 50 to the upper end of the vertical portion 52.

When the retainer 10 is applied to a landscape body such as the brick 12, the bases 14 and 16 engage the lower surface 14 of the brick and the arms 22 and 24 engage opposite vertical side surfaces 15 and 17 of the brick. The brick 12 with the retainer 10 attached thereto is positioned above the ground at a desired location with the feet 18 and 20 facing the ground. The brick 10 is then pushed downwardly to force the feet 18 and 20 into the ground until the bottom surface 13 of the brick touches the ground. The brick 10 is thereby retained by the arms 22 and 24 anchored to the ground by the feet 18 and 20.

It is preferred that the retainer 10 be made of a single piece of steel wire which can be deformed by bending, but which has a certain degree of resiliency prior to be deformed by bending which occurs after the elastic limit of bending of the wire has been reached. Normally, the distance between the arms 22 and 24 is slightly less than the landscape body which is to be retained. The landscape body is forced between the arms 22 and 24 and thereafter clamped therebetween due to the resiliency of the arms 22 and 24. The V-shaped configuration of the feet 18 and 20 serve four functions. First, the V-shaped configuration facilitates penetration of the feet into the ground. The V-shaped configuration also enables the arms 22 and 24 to be moved toward and away from each other to accommodate landscape elements of different widths. Still further, the springiness of the two elements of each of the feet 18 and 20 add to the biasing effect of the arms 22 and 24 against the side surfaces of the landscape body. Finally, as the feet 18 are forced into the ground, the elements of the feet are forced together which increases the clamping effect of the arms on the landscape element.

The retainer 10 is made for a landscape body having a standard width. If a narrower landscape body is utilized, the elements of the feet 18 and 20 are moved together beyond their elastic bending limit so that the distance of the arms 22 and 24 are slightly less than the width of the landscape body to preserve the biasing effect of the arms against the sides of the body. If the retainer is to be applied to a landscape body having a larger width, the elements of the feet 18 and 20 are moved away from each other beyond the bending elastic limit of the feet so that the distance between the arms 22 and 24 is slightly less than the width of the larger landscape body so that arms 22 and 24 will be biased against the sides of the body when the body is placed therebetween.

Clearly, minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by letters patent is:

1. A retainer for a generally rectangular landscape body which has a bottom surface and at least two opposite vertical side surfaces, said retainer comprising:
    (a) a horizontal base for engaging the bottom surface of a landscape body,
    (b) a pair of spaced opposed arms which extend upwardly from said base engaging said opposite vertical sides surfaces of the body, and
    (c) at least one foot which extends downwardly from the base for penetrating the ground and anchoring said body at a desired position on the ground, said foot comprising two rod-like elements which are spaced at the top of the foot, said rod-like elements converging toward the bottom of the foot and are joined at the bottom of the foot.

2. A retainer as recited in claim 1, wherein said arms are made of a flexible resilient material for yieldably clamping the body therebetween.

3. A retainer as recited in claim 1, wherein said horizontal base comprises two spaced portions, one of said portions being connected to one of said rod-like elements and to one of said arms, and the other of said portion being connected to the other of said rod-like elements and to the other of said arms.

4. A retainer as recited in claim 1, wherein said rod-like elements are made of a flexible resilient material which enables the arms to be moved away from each other for receiving a landscape body therebetween and for biasing the arms against said opposite side surfaces of the landscape body for clamping said body therebetween.

5. A retainer for a generally rectangular landscape body which has a bottom surface, and at least two opposite vertical side surfaces, said retainer comprising:
    (a) a first horizontal base for engaging the bottom surface of a landscape body,
    (b) a second horizontal base which is spaced from the first base for engaging the bottom surface of a landscape body,
    (c) a first foot which is connected to said first base and which extends downwardly from said first base for penetrating the ground and for anchoring said body at a desired location on the ground,
    (d) a second foot which is connected to said second base and which extends downwardly from said second base for penetrating the ground and for anchoring said body at a desired location on the ground,
    (e) a first elongated arm which is connected to said first and second bases so that said first arm extends from said first base to said second base and upwardly from said bases for engaging one of said opposite side surfaces of said landscape body, and
    (f) a second elongated arm which is spaced from said first arm and which is connected to said first and second bases so that said second arm extends from said first base to said second base and upwardly from said bases for engaging the other of said opposite side surfaces of said landscape body so that said body is confined between said arms, each of said first and second feet comprising two rod-like elements which are spaced at the top of the foot, said rod-like elements converging toward the bottom of the foot and joining together at the bottom of the foot, each of said bases comprising spaced portions, one of said spaced portions being connected to one of said rod-like elements and to said first arm and the other of said spaced portions being connected to the other of said rod-like elements and to said second arm.

6. A retainer as recited in claim 5, wherein rod-like elements are made of a flexible resilient material which enables the arms to be moved away from each other for receiving a landscape body therebetween and for biasing the arms against said opposite side surfaces of the landscape body for clamping said body therebetween.

7. A retainer as recited in claim 5, wherein the retainer if formed of a single continuous rod which has a plurality of bends to define the elements of the retainer as claimed.

8. A retainer for a generally rectangular landscape body which has a bottom surface and at least two opposite vertical side surfaces, said retainer being constructed of a single continuous length of wire and having:

(a) a pair of spaced base portions, each base portion having a pair of spaced horizontal sections and a downwardly extending V-shaped section between said horizontal sections which functions as a foot for anchoring the retainer in the ground, (b) a pair of spaced parallel arm portions which are connected to the horizontal sections of said base portions, each of said arm portions comprising:

(1) a first section which extends upwardly from one of the horizontal sections of one of said base portions, (2) a second section which extends upwardly from one of the horizontal sections of the other of said base portions, and (3) a third section which extends horizontally from said first section to said second section, so that when said retainer is applied to said landscape body, the horizontal sections of each of said base portions abuts the bottom surface of said landscape body, one of said arm portions abuts one of said vertical side surfaces and the other of said arm portions abuts the other of said vertical side surfaces.

9. A retainer as recited in claim 8, wherein said wire is steel which can be deformed by bending upon exceeding its limit of bending elasticity and which is flexible and resilient prior to reaching said limit of bending elasticity.

* * * * *